Figure 1:
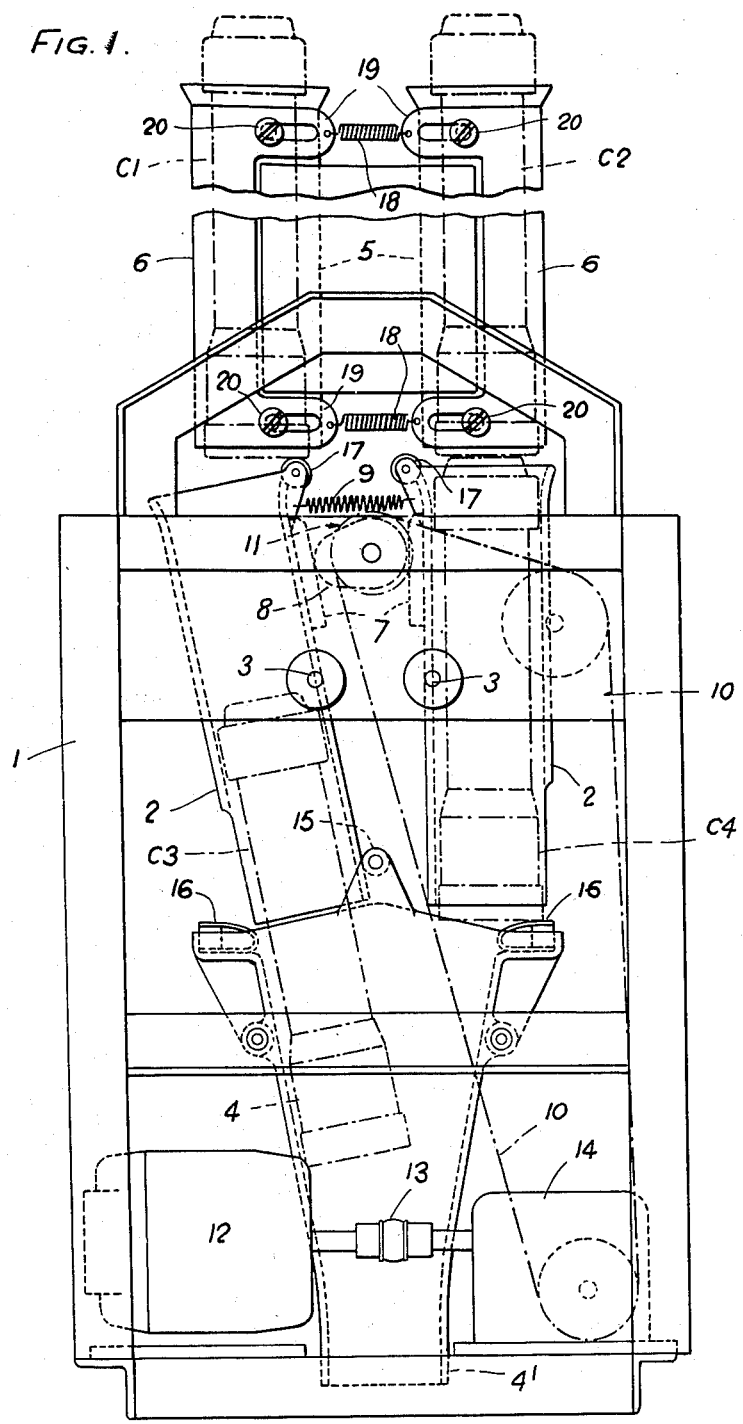

May 22, 1956  J. R. KIRK  2,746,697
PNEUMATIC TUBE CONVEYOR SYSTEMS
Filed June 16, 1953  2 Sheets-Sheet 1

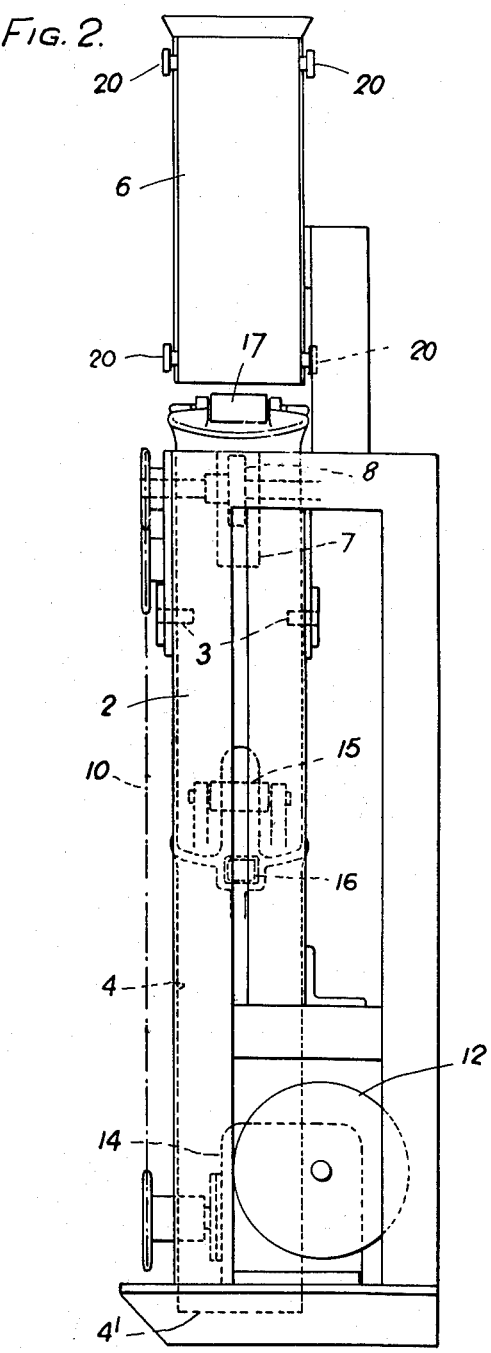

United States Patent Office 2,746,697
Patented May 22, 1956

2,746,697

PNEUMATIC TUBE CONVEYOR SYSTEMS

John Robert Kirk, London, England, assignor to The Lamson Corporation, Syracuse, N. Y.

Application June 16, 1953, Serial No. 362,021

2 Claims. (Cl. 243—29)

This invention relates to pneumatic tube conveyor systems. In the most elementary systems of this kind a carrier is conveyed pneumatically directly from the despatch terminal to the discharge terminal through one conveyor tube and returns through another, the two tubes comprising a continuous air circuit. Such a system is cumbersome and wasteful of material, particularly if it is necessary, as in any really satisfactory practical form of pneumatic tube conveyor system, to arrange that each of a number of despatch terminals may be put into communication with any one of a number of discharge terminals.

To reduce the number of conveyor tubes in a multi-terminal system, one or more exchange stations may be introduced. Exchange stations originally took the form of depots to which the carriers fed into any despatch terminal of the system emerged and from which the carriers were distributed manually to tubes or conduits leading to the discharge terminals for which they were intended. Greater efficiency is possible if the exchange station is automatic and the efficiency of multi-terminal pneumatic tube conveyor systems depends very largely on the efficiency of the exchange station or stations which they incorporate.

In a penumatic tube conveyor system incorporating one form of automatic or mechanical exchange station, a carrier inserted into the system at any despatch terminal is led to the exchange station by a despatch tube. A carrier passing from the despatch tube through the exchange station emerges therefrom through a discharge conduit and is then conveyed either directly to a discharge tube which may be connected at will to any of several discharge terminals or through further control apparatus directly to one of a number of tubes each of which serves only one discharge terminal. The purpose of the exchange station is to control the rate at which the carriers are allowed to pass from the despatch tube to the common discharge conduit and hence to the discharge terminals. The use of an exchange station in a pneumatic tube conveyor system makes it unnecessary to take account of the rate at which carriers can be allowed to proceed towards the discharge terminals when the carriers are fed into the system because the carriers will be held up by the exchange station and released to the discharge terminals at a predetermined maximum rate which is not effected by the rate at which they are fed into the system.

It will be clear that an exchange station incorporated in a busy pneumatic tube conveyor system in which the carriers are numerous and frequently used must be efficient in order that the efficiency of the system shall not be impaired as a result of a congestion of carriers in the region of the exchange station.

It is an object of the invention to provide an improved pneumatic tube conveyor system incorporating an exchange station which may be operated automatically.

According to the invention a pneumatic tube conveyor system comprises two or more delivery tubes through which carriers can pass, two or more movable transfer sections, each of which is associated with one of the delivery tubes of the system at that end of the tube from which a carrier passing through the tube emerges and with a discharge conduit common to at least two of the transfer sections, each transfer section being movable between a position relative to its associated delivery tube and the discharge conduit such that a carrier contained in the said delivery tube may pass into the transfer section but is prevented from passing into the discharge conduit and a position relative to its associated delivery tube and the discharge conduit such that a carrier contained in the transfer section may pass to the discharge conduit whilst any carrier contained in the said delivery tube is prevented from passing into the transfer section.

The delivery tubes may in practice form part or all of the despatch tubes or may be separate extensions thereof. The transfer sections may be either pivotally movable or movable bodily. When the exchange station is in operation any transfer section should be in its displaced position, i. e. the position from which the carrier is released into the discharge conduit, for a time at least sufficient to allow a carrier to pass completely out of the transfer section. Since the carriers are of known length and weight and fall from the transfer sections under gravity the time for which the transfer sections must remain in their displaced positions in order to allow the carriers to fall clear of them may be predetermined. Any transfer section should also be in its normal position, i. e. the position in which a carrier may pass into the transfer section for a time sufficient to allow a carrier contained in the delivery tube to pass completely into the transfer section. A satisfactory method of operating the transfer sections provides that each is normally in such a position that any carrier inserted into the despatch tube at the despatch terminal may pass directly through the delivery tube into the transfer section provided, of course, that there is no carrier already in the section. The transfer sections may be conveniently moved from their normal positions by a cam and restored thereto by a spring.

Although the action of the cam or other means used for displacing the transfer sections from their normal positions can be so arranged that when a transfer section is moved to the position from which a carrier which it contains may pass into the discharge conduit it may be held in that position for long enough to enable the carrier to pass completely into the discharge conduit before the transfer section is restored to its normal position by the action of the spring, the fact that the carriers are fed into despatch tubes arbitrarily, makes it impossible to ensure without further modifications to the equipment, that the transfer sections will not start to move from their normal positions while a carrier is partially in the transfer section and partially in the delivery tube. If the maximum movement of the transfer section is not great, and if the carriers are of a suitable size and shape, this may not be important. However, when the carriers are of the kind commonly employed in pneumatic tube conveyor systems, i. e. carriers in which the body portions are contained between end pieces of wider diameters, some safety mechanism will usually be necessary if the ssytem is to be able to work efficiently and without damage. Such a mechanism may be conveniently provided by arranging that the cross sections of the ends of the delivery tubes from which the carriers emerge are expandible. For example, the delivery tube may be split axially into two sections. The two sections may be held together solely by the action of springs, by being hinged together at one end so that one part is pivotally movable with respect to the other or by any other method which permits the movement of one section with respect to the other.

The shape of the discharge conduit is governed primarily by the consideration that it must be able to receive carriers from the transfer sections and lead them either to a common discharge terminal or through further control apparatus which arranges for any particular carrier to be delivered at any of a number of discharge terminals. The operation of the further control apparatus may be determined electrically by the exchange station. The electrical arrangements, however, form no part of the present invention.

When the transfer section is in the position relative to its associated delivery tube and discharge conduit such that a carrier contained in the delivery tube may pass into the transfer section the carrier may be prevented from passing into the discharge conduit by means of a pad of rubber mounted in such a position on the upper edge of the conduit that a carrier falling into the transfer section will rest on the pad. The pad is preferably armoured with a thin sheet of metal to minimise not only the wear of the rubber but also the friction between the buffer and the surfaces of the carrier which come into contact with it.

When the transfer section is in the position relative to its associated delivery tube and the discharge conduit such that a carrier contained in the transfer section may pass into the discharge conduit further carriers may be prevented from passing into the transfer section by means of a rubber covered roller mounted on the edge of the transfer section in such a position that, when the transfer section is displaced to allow any carrier which it contains to emerge, it arrests the motion of a carrier falling through the delivery tube.

By way of example a part of a pneumatic tube conveyor system constructed in accordance with the invention will now be described with reference to the accompanying drawings in which Fig. 1 represents a rear view of the part of the pneumatic tube conveyor system embodying an exchange station in which there are two pivotally mounted transfer tubes, and Fig. 2 represents a side view of the same apparatus.

The apparatus shown in the drawings is mounted on the framework 1. Transfer sections 2 are pivotally mounted at 3 above a discharge conduit 4. The delivery tubes are shown in the drawings as being separate from the despatch tubes, which are not illustrated. Each of the delivery tubes comprises the parts 5 and 6. Carriers C1 and C2 are shown in each of the delivery tubes in the positions in which they are held before being allowed to drop into the transfer sections 2.

A transfer section 2 consists of a cylindrical tube on the outside of one end of which is fixed the plate 7 with which the cam 8 co-operates. The cam 8 is mounted on a horizontal axis and rotates to tilt each transfer section 2 in turn about its pivot point. The spring 9 serves to restore the transfer sections 2 to the normal positions from which they are displaced by the cam 8. In Fig. 1 of the drawings, the transfer section 2 on the left is shown displaced by the cam 8 into alignment with a passage through the discharge conduit 4 and a carrier C3 is shown passing from the transfer section 2 into the discharge conduit 4. The section 2 on the right is shown in its normal position i. e. in alignment with the delivery tube, and a carrier C4 is shown awaiting release into the discharge conduit 4. The internal diameters of the delivery tubes and the transfer sections 2 are the same as or slightly greater than that of the despatch tubes while the length of each transfer section is such that one carrier may be wholly contained therein without impeding the movement of the section 2 under the action of the cam 8.

The cam 8 is operated by the action of the chain or cable 10 which passes over the wheel 11. The cable 10 is driven by the motor 12 connected through the coupling 13 to the gearing indicated generally at 14. The shape of the cam 8 and the speed at which it is driven by the gearing 14 are such that whilst the transfer section 2 is normally in the position of the transfer section 2 shown on the right of Fig. 1 it is held in the position of the section 2 shown on the left of the figure for long enough to allow a carrier contained in the transfer section 2 to pass completely into the discharge conduit 4.

The discharge conduit 4 is a roughly funnel-shaped casting provided with a through opening which tapers from a mouth at one end which is wide enough to receive from each of the transfer sections 2 when in their displaced positions any carriers which they contain to a discharge tube 4' whose internal diameter is substantially the same as the internal diameter of the delivery tube. Internally the discharge conduit 4 should be smooth and so curved that any carrier falling longitudinally into it will fall without hindrance through it. The discharge tube 4' of the discharge conduit 4 leads the carrier either directly to a discharge terminal or directly or indirectly through a further piece of equipment which diverts it to any predetermined one of a number of discharge terminals.

Mounted across the centre of the mouth of the discharge conduit 4 is the stop 15 whose purpose is to supplement the natural effect of the spring 9 in preventing the transfer section 2 from being thrown by the cam 8 to a position beyond that in which a carrier contained in the transfer section 2 may fall from it into the discharge conduit 4. Mounted at each side of the conduit 4 are buffers 16. When the transfer sections 2 are in their normal positions the motion of the carriers falling into them from the delivery tubes will be arrested by the buffers 16 and the carriers will rest, as C4, on the buffers 16 until the transfer sections 2 are moved into the positions from which the carriers are released into the discharge conduit 4. It will be seen that the buffers 16 have to serve the double purpose of absorbing the impact of the falling carrier and supporting the carrier on a surface which presents little frictional resistance to the lateral movement of the carrier during the displacement of the transfer section 2 containing the carrier from its normal position. They may satisfactorily take the form of pads of rubber whose upper surfaces are arcuate, and armoured as shown in the drawings with strips of steel or of other hard wearing resilient material.

Buffer devices 17 are also provided on the upper edges of the transfer sections 2 since, as will be seen, the motion of a carrier emerging from the despatch tube when the transfer section 2 is in the position of the left-hand of the two transfer sections shown in the drawing will be interrupted by the edge of the transfer section 2. The carrier, as indicated by C1, will rest on this roller until the transfer section 2 returns to its normal position. Satisfactory buffers are in the form of rubber covered rollers 17. The rolling action of these buffers 17, though not essential, is desirable to reduce the friction between the buffer and any carrier contained within the despatch tube. The friction would be considerable if there were only one carrier in the despatch tube. There may, however, be more than one waiting carrier and the friction would be increased accordingly.

If buffer arrangements, such as those illustrated, are used, no alteration of the existing carriers would be necessary. Alternatively, if the carriers are suitably adapted e. g. by being fitted with resilient end caps, special resilient buffer means may be dispensed with and the carriers allowed to fall directly onto the edges of the transfer sections 2 and the discharge conduit 4.

Although it is possible to design the cam 8 so that the transfer section 2 is held in its displaced position for long enough to allow any carrier contained by the section 2 to pass entirely into the discharge conduit 4 the rate and times at which carriers are fed into the despatch tubes, and consequently the delivery tubes, from the despatch terminals are not controlled. It follows therefore that the cam 8 might operate to displace the transfer tube 2 whilst a carrier is in the process of passing into it from the delivery tube. Unless preventative arrangements are made this might have a serious jamming effect. In the drawing the lower ends of the delivery tubes are shown as being in two longitudinal parts—the section 5 being fixed to the frame 1 whilst the section 6 is slidably fastened to the section 5. This slidable connection is provided by slotted lugs 19 formed on the section 6 which are free to slide along the headed pins 20 projecting from the sections 5. It will be clear that if the transfer section 2 is displaced while a carrier is still in transit between the delivery tube and the transfer section 2, part 6 of the delivery tube will be displaced and so avoid the possibility of jamming the carrier. The springs 18 will restore the displaced parts 6 to normal after the displacing force has been removed.

Although in the embodiment illustrated there are only two transfer sections 2 operated by a single cam 8 rotating about a horizontal axis, either several cams displaced relatively to each other along a single axis or one cam made to rotate about a vertical axis could be used to control the rate at which carriers are fed from either two or more than two delivery tubes into the common discharge conduit.

Alternatively, if there are several delivery tubes to be controlled, an exchange station could be provided for each group of two or more delivery tubes, carriers discharged from the exchange stations being fed through further exchange stations before being released at a controlled rate to the discharge terminal or discharge terminals.

Instead of being pivoted at the points 3, the transfer sections 2 could be movable in directions at right angles to their axes and would in that case, always remain vertical. Although the funnel shaped discharge conduit 4, which has been described, could be used, the conduit might simply take the form of a tube with which the transfer sections are aligned consecutively. Moreover, although in the embodiment described the transfer sections are each long enough to accommodate only one carrier other embodiments may be constructed in which the transfer sections can accommodate more than one carrier.

I claim:

1. A pneumatic tube conveyor system comprising a plurality of delivery tubes through which carriers can pass, movable transfer sections each associated respectively with one of said delivery tubes at the end of the tube from which a carrier passing through the tube emerges, a discharge conduit common to said transfer sections and adapted to receive carriers therefrom, each transfer section being movable between a receiving position relative to its associated delivery tube such that a carrier contained in the said delivery tube may pass into the transfer section and a discharging position relative to the discharge conduit such that a carrier contained in the transfer section may pass into the discharge conduit, means operative while each transfer section is in its receiving position for preventing the discharge from the transfer section of any carrier contained therein, means operative while each transfer section is in its discharging position for preventing the passage of any carrier contained in its associated delivery tube into the transfer section, and means for successively moving said transfer sections between said receiving and discharging positions in a predetermined sequence, said delivery tubes having expandible cross-sections adjacent the transfer sections, whereby should a transfer section be moved to its discharging position while a carrier is in transit between its associated delivery tube and the transfer section, the carrier will expand the delivery tube to avoid jamming of the carrier between the delivery tube and the transfer section.

2. A pneumatic tube conveyor system as claimed in claim 1 in which each of the transfer sections is pivotally mounted for tilting movement about its pivot and the transfer sections are tilted between their receiving and discharging positions by means of a cam.

References Cited in the file of this patent

UNITED STATES PATENTS

| 406,446 | Kennedy | July 9, 1889 |
| 1,538,027 | Cushing | May 19, 1925 |
| 2,219,827 | Kimball et al. | Oct. 29, 1940 |

FOREIGN PATENTS

| 409,016 | Great Britain | Apr. 17, 1934 |
| 121,220 | Australia | Apr. 4, 1946 |